(12) United States Patent
Fujimoto et al.

(10) Patent No.: US 7,973,900 B2
(45) Date of Patent: Jul. 5, 2011

(54) LIQUID CRYSTAL DISPLAY DEVICE

(75) Inventors: Takamitsu Fujimoto, Ishikawa-gun (JP); Shin Morita, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 55 days.

(21) Appl. No.: 12/436,574

(22) Filed: May 6, 2009

(65) Prior Publication Data

US 2010/0007838 A1    Jan. 14, 2010

(30) Foreign Application Priority Data

Jul. 9, 2008    (JP) ................................. 2008-179361

(51) Int. Cl.
*G02F 1/1343*    (2006.01)
(52) U.S. Cl. ........................................ 349/141; 349/139
(58) Field of Classification Search ........................ None
See application file for complete search history.

(56) References Cited

U.S. PATENT DOCUMENTS

| | | | |
|---|---|---|---|
| 6,449,026 | B1 | 9/2002 | Min et al. |
| 7,443,477 | B2 * | 10/2008 | Lin et al. ...................... 349/141 |
| 2002/0105612 | A1 * | 8/2002 | Ohta et al. ..................... 349/141 |
| 2005/0078262 | A1 * | 4/2005 | Ono et al. ...................... 349/141 |
| 2007/0070282 | A1 | 3/2007 | Shibahara et al. |
| 2007/0242204 | A1 * | 10/2007 | Fujita et al. ..................... 349/141 |
| 2008/0018836 | A1 * | 1/2008 | Huh et al. ...................... 349/106 |
| 2008/0137017 | A1 * | 6/2008 | Arai et al. ...................... 349/139 |

FOREIGN PATENT DOCUMENTS

| | | |
|---|---|---|
| JP | 2007-086205 | 4/2007 |
| KR | 2002-0048854 | 6/2002 |
| KR | 2002-0063498 | 8/2002 |

OTHER PUBLICATIONS

Official Communication from Korean Patent Office dated Dec. 14, 2010, in counterpart Korean Patent Application No. 10-2009-44383 (4 pages).

* cited by examiner

*Primary Examiner* — (Nancy) Thanh-Nhan P Nguyen
(74) *Attorney, Agent, or Firm* — Finnegan, Henderson, Farabow, Garrett & Dunner, L.L.P.

(57) ABSTRACT

An array substrate of a liquid crystal display device includes an insulating substrate, a gate line extending in a first direction on the insulating substrate, a first insulation film which is disposed to cover the gate line, pixel electrodes which are disposed on the first insulation film in respective pixels, a source line which is disposed on the first insulation film and extends between the pixel electrodes along a second direction, a second insulation film which is disposed to cover the pixel electrode and the source line, and a common electrode which is disposed on the second insulation film in a manner to face the pixel electrode of each of the pixels and to face the gate line, and includes a slit which is opposed to the pixel electrode.

5 Claims, 6 Drawing Sheets

FIG. 8 ary crystal display device of a liquid crystal mode which makes use of a transverse electric field according to an embodiment of the present invention.

LIQUID CRYSTAL DISPLAY DEVICE

CROSS-REFERENCE TO RELATED APPLICATIONS

This application is based upon and claims the benefit of priority from prior Japanese Patent Application No. 2008-179361, filed Jul. 9, 2008, the entire contents of which are incorporated herein by reference.

BACKGROUND OF THE INVENTION

1. Field of the Invention

The present invention relates generally to a liquid crystal display device, and more particularly to a liquid crystal display device which is configured to have a pixel electrode and a common electrode on one of substrates which constitute the liquid crystal display device.

2. Description of the Related Art

In recent years, flat-panel display devices have vigorously been developed. Liquid crystal display devices, in particular, are applied to various fields by making use of such features as light weight, small thickness and low power consumption. The liquid crystal display device is configured such that a liquid crystal layer is held between a pair of substrates. The modulation ratio of light passing through the liquid crystal layer is controlled by an electric field between a pixel electrode and a common electrode, thereby displaying an image.

In the field of liquid crystal display devices, particular attention has been paid to the structure which makes use of transverse electric fields including a fringe electric field, from the standpoint of an increase in viewing angle.

The liquid crystal display device of a transverse electric field mode, such as an in-plane switching (IPS) mode or a fringe field switching (FFS) mode, includes a pixel electrode and a common electrode which are formed on an array substrate, and liquid crystal molecules are switched by generating a transverse electric field that is substantially parallel to the major surface of the array substrate (see, e.g. Jpn. Pat. Appln. KOKAI Publication No. 2007-86205).

BRIEF SUMMARY OF THE INVENTION

According to an aspect of the present invention, there is provided a liquid crystal display device which is configured to hold a liquid crystal layer between a first substrate and a second substrate, the first substrate comprising: an insulating substrate; a gate line extending in a first direction on the insulating substrate; a first insulation film which is disposed to cover the gate line; pixel electrodes which are disposed on the first insulation film in respective pixels; a source line which is disposed on the first insulation film and extends between the pixel electrodes along a second direction which crosses the first direction; a second insulation film which is disposed to cover the pixel electrode and the source line; and a common electrode which is disposed on the second insulation film in a manner to face the pixel electrode of each of the pixels and to face the gate line, and includes a slit which is formed to face the pixel electrode.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A liquid crystal display device according to an embodiment of the present invention will now be described with reference to the accompanying drawings. An FFS mode liquid crystal display device is described below as an example of a liquid crystal display device of a liquid crystal mode in which a pixel electrode and a common electrode are provided on one of substrates and liquid crystal molecules are switched by mainly using a transverse electric field (or an electric field that is substantially parallel to the major surface of one of the substrates) that is produced between the pixel electrode and the common electrode.

Figure 1:
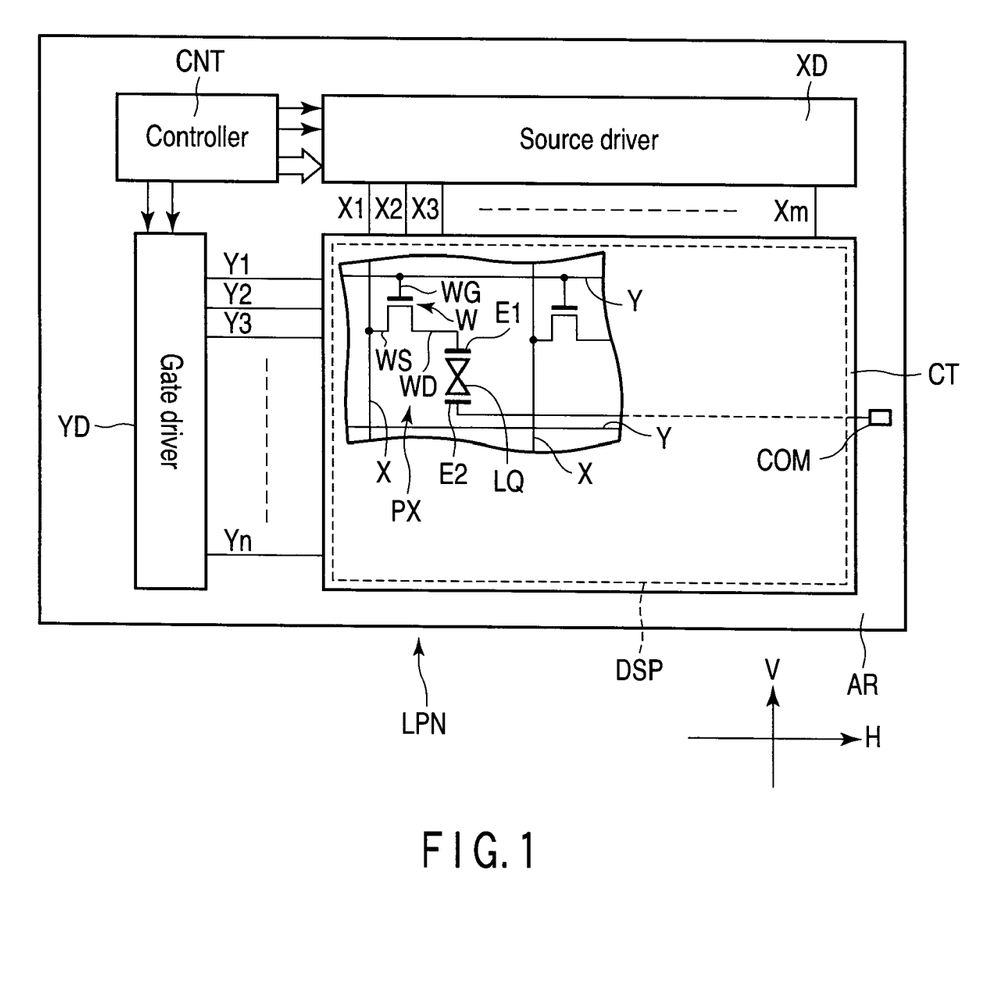
FIG. 1 schematically shows the structure of a liquid crystal display device of a liquid crystal mode which makes use of a transverse electric field according to an embodiment of the present invention.
Figure 2:
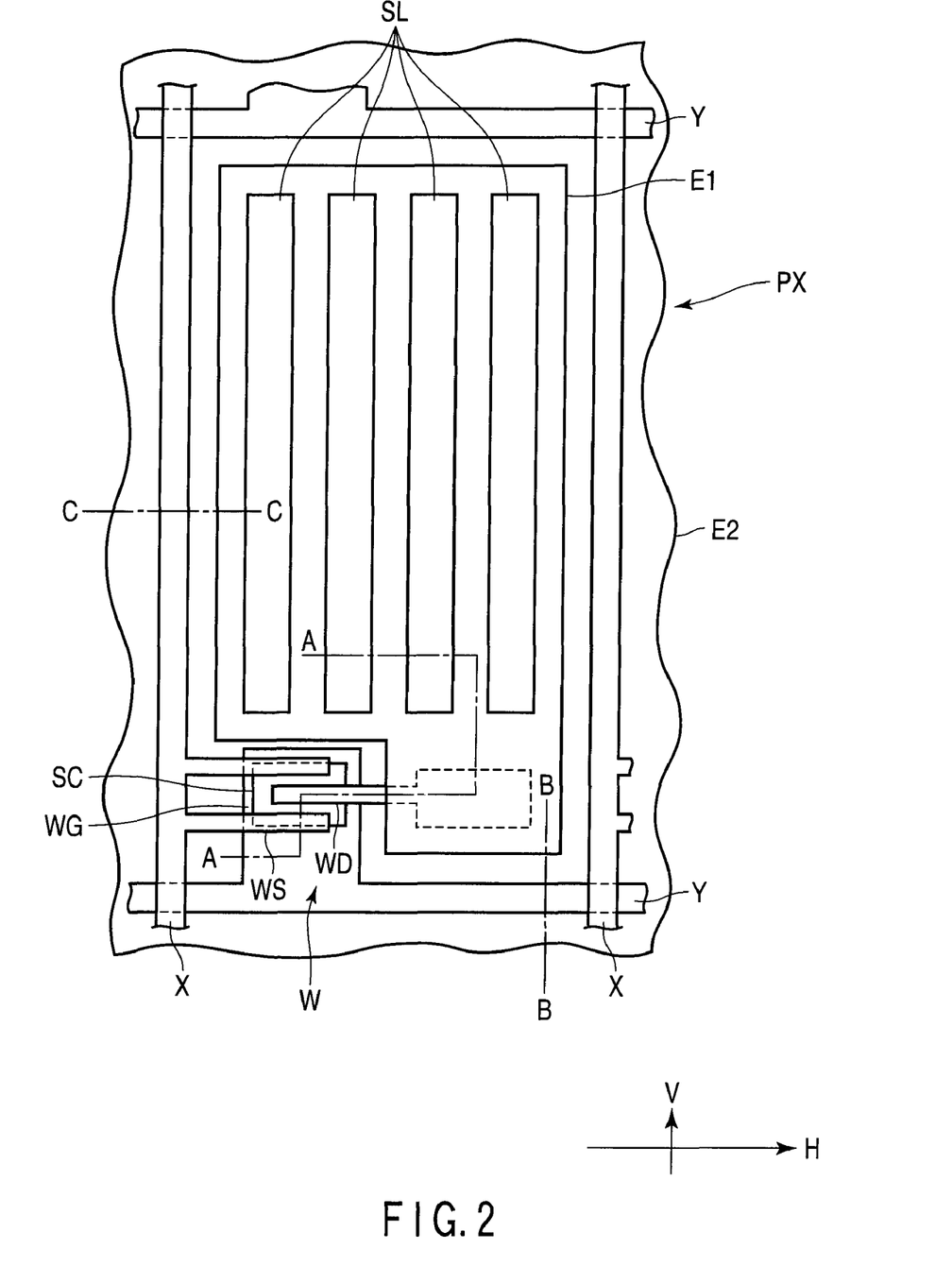
FIG. 2 is a plan view that schematically shows the structures of a pixel, which is applied to the liquid crystal display device of FIG. 1.

As is shown in FIG. 1, the liquid crystal display device is an active matrix type liquid crystal display device, and includes a liquid crystal display panel LPN. The liquid crystal display panel LPN includes an array substrate AR that is a first substrate, a counter-substrate CT that is a second substrate and is disposed to be opposed to the array substrate AR, and a liquid crystal layer LQ which is held between the array substrate AR and the counter-substrate CT. This liquid crystal display panel LPN includes a display area DSP which displays an image. The display area DSP is composed of a plurality of pixels PX which are arrayed in a matrix of m×n.

The array substrate AR includes, in the display area DSP, an (m×n) number of pixel electrodes E1 which are first electrodes and are disposed in association with the respective pixels PX; an n-number of gate lines Y (Y1 to Yn) that extend in a row direction H of the pixels PX, which is a first direction; an m-number of source lines X (X1 to Xm) that extend in a column direction V of the pixels PX, which is a second direction; an (m×n) number of switching elements W which are disposed in regions including intersections between the gate lines Y and source lines X in the respective pixels PX; and a common electrode E2 which is a second electrode and is disposed to be opposed to the pixel electrodes E1 via an interlayer insulation film.

Each of the switching elements W is composed of, e.g. a thin-film transistor. A gate electrode WG of the switching element W is electrically connected to the gate line Y. A source electrode WS of the switching element W is electrically connected to the source line X. A drain electrode WD of the switching element W is electrically connected to the pixel electrode E1.

The liquid crystal display device includes a gate driver YD, a source driver XD and a controller CNT. At least parts of the gate driver YD and source driver XD may be disposed on a peripheral region of the display area DSP of the array substrate AR. The gate driver YD is connected to the n-number of gate lines Y which are led out of the display area DSP. The source driver XD are connected to the m-number of source lines which are led out of the display area DSP. The gate driver YD successively supplies a scanning signal (driving signal) to the n-number of gate lines Y on the basis of the control by the controller CNT. The source driver XD supplies video signals (driving signals) to the m-number of source lines X on the basis of the control by the controller CNT at a timing when the switching elements W of each row are turned on by the scanning signal. Thereby, the pixel electrodes E1 of each row are set at pixel potentials corresponding to the video signals that are supplied via the associated switching elements W. The common electrode E2 is electrically connected to a common wiring line COM of a common potential.

The structure of the array substrate AR is described below in greater detail.

As shown in FIG. 2 to FIG. 5, the array substrate AR is formed by using an insulating substrate 20 with light transmissivity, such as a glass plate. Specifically, in the array substrate AR, the gate line Y is disposed on the insulating substrate 20. The insulating substrate 20 and gate line Y are covered with a first insulation film IL1. The first insulation film IL1 is formed of an inorganic material such as silicon nitride (SiN).

The source line X is disposed on the first insulation film IL1. The source line X is substantially perpendicular to the gate line Y via the first insulation film IL1. The gate line Y and source line X are formed of an electrically conductive material such as molybdenum, aluminum, tungsten or titanium.

The pixel electrode E1 is disposed on the first insulation film IL1. In other words, the pixel electrode E1 is disposed in the same layer as the source line X. Each source line X is disposed between the pixel electrodes E1 which neighbor in the row direction H. The pixel electrode E1 is formed of a material that is different from the material of the source line X, etc., and is formed, for instance, a light-transmissive, electrically conductive material such as indium tin oxide (ITO) or indium zinc oxide (IZO). The pixel electrode E1 is formed in an island shape corresponding to the pixel shape in each pixel, for example, a substantially rectangular shape.

A semiconductor layer SC of the switching element W can be formed of, e.g. polysilicon or amorphous silicon. The semiconductor layer SC is disposed on the first insulation film IL1 so as to be opposed to the gate electrode WG.

The gate electrode WG is formed integral with the gate line Y. The source electrode WS is formed integral with the source line X and is put in contact with a source region of the semiconductor layer SC. The drain electrode WD is connected to the pixel electrode E1 and is put in contact with a drain region of the semiconductor layer SC. Specifically, the pixel electrode E1 and the drain electrode WD of the switching element W are directly connected, without intervention of a through-hole. The source electrode WS and the drain electrode WD are disposed on the first insulation film IL1, and can be formed of the same material as the source line X.

The pixel electrode E1, the source line X, and the source electrode WS and drain electrode WD of the switching element W are covered with a second insulation film IL2. The second insulation film IL2 is formed of an inorganic material such as silicon nitride (SiN).

The common electrode E2 is disposed on the second insulation film IL2. The common electrode E2 is opposed to the pixel electrode E1 of each pixel PX via the second insulation film IL2. Specifically, the second insulation film IL2 functions as an interlayer insulation film lying between the common electrode E2 and the pixel electrode E1.

In the common electrode E2, slits SL which face the pixel electrode E1 are formed. Each slit SL of the common electrode E2 has, for example, a substantially rectangular shape. The common electrode E2, like the pixel electrode E1, is formed of a light-transmissive, electrically conductive material such as ITO or IZO.

The common electrode E2, as described above, is electrically connected to the common wiring line COM. For example, the common wiring line COM may be disposed on the insulating substrate 20, that is, in the same layer as the gate line Y, etc., and may be formed of the same material as the gate line Y, etc. The first insulation film IL1 and second insulation film IL2 are interposed between the common wiring line COM and the common electrode E2, and the common wiring line COM and the common electrode E2 are electrically connected via a through-hole which penetrates the first insulation film IL1 and second insulation film IL2.

That surface of the array substrate AR, which is in contact with the liquid crystal layer LQ, is covered with an alignment film AL1.

Figure 3:
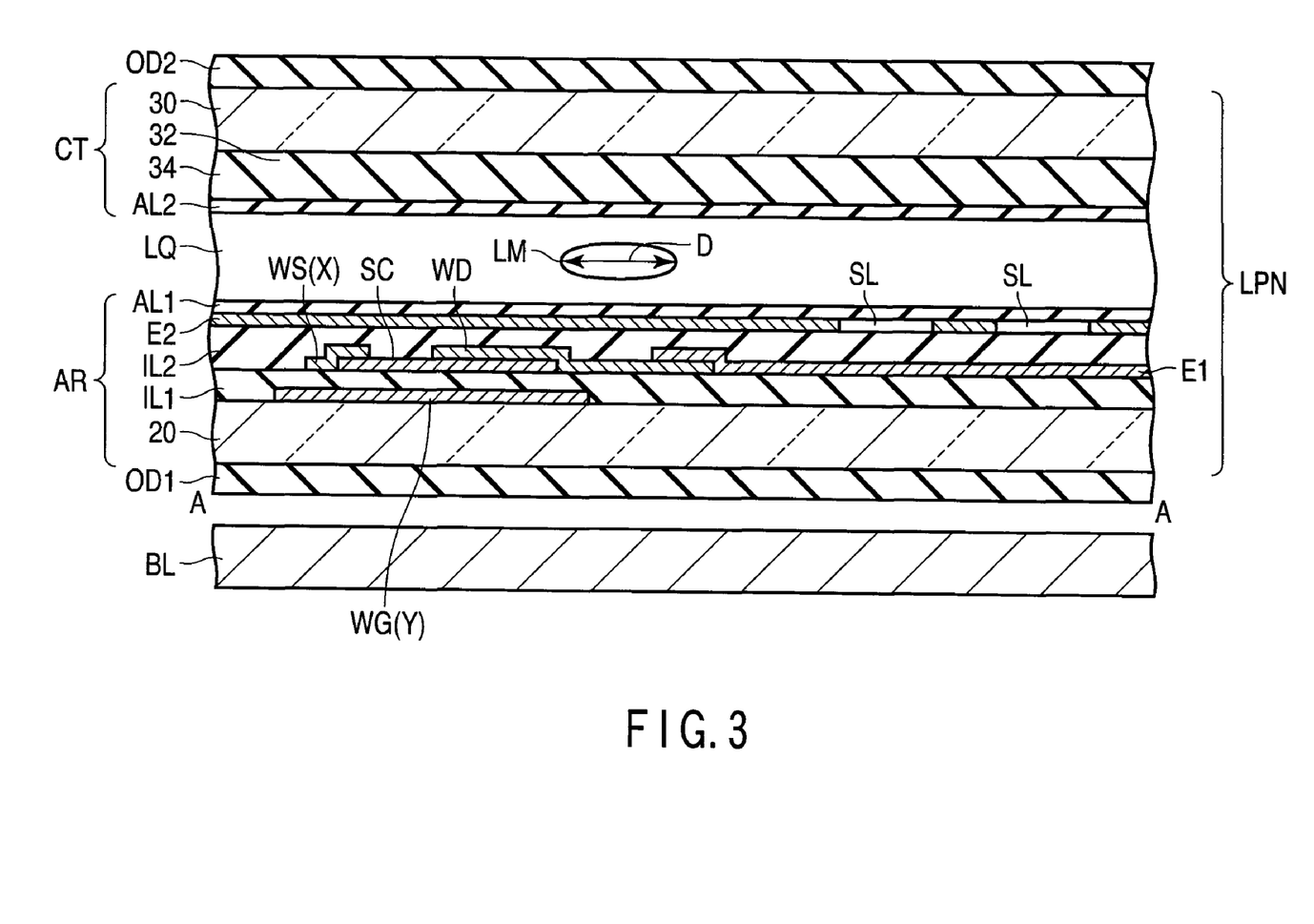
FIG. 3 is a cross-sectional view showing a cross-sectional structure of the pixel of FIG. 2, taken along line A-A in FIG. 2.

On the other hand, the counter-substrate CT is formed by using a light-transmissive, insulating substrate 30, such as a glass plate. As shown in FIG. 3, the counter-substrate CT includes, on an inner surface of the insulating substrate 30 (i.e. on a surface opposed to the liquid crystal layer LQ), a black matrix 32 which divides the pixels PX.

The black matrix 32 is disposed in a lattice shape on the insulating substrate 30 so as to be opposed to the gate lines Y, source lines X and wiring portions of the switching elements W, etc., which are provided on the array substrate AR. The black matrix 32 is formed of, for example, a black color resin.

In particular, in a color-display-type liquid crystal display device, the counter-substrate CT includes a color filter layer 34 which is disposed in a region surrounded by the black matrix 32. The color filter layer 34 is disposed on the insulating substrate 30 and is formed of color resins of different colors, for example, the three primary colors of red, blue and green. The red color resin, blue color resin and green color resin are disposed in association with the red pixel, blue pixel and green pixel, respectively.

In the above-described liquid crystal mode which makes use of the transverse electric field, it is desirable that the surface of the counter-substrate CT, which is in contact with the liquid crystal layer LQ, be planar. Thus, the counter-substrate CT should preferably have an overcoat layer which is disposed with such a relatively large film thickness as to planarize irregularities on the surface of the color filter layer 34.

That surface of the counter-substrate CT, which is in contact with the liquid crystal layer LQ, is covered with an alignment film AL2.

The above-described counter-substrate CT and array substrate AR are disposed such that their alignment films AL1 and AL2 are opposed to each other. At this time, a predetermined gap is created by spacers (not shown) (e.g. columnar spacers which are formed integral on one of the substrates by using a resin material) between the alignment film AL1 of the array substrate AR and the alignment film AL2 of the counter-substrate CT. The liquid crystal layer LQ is formed of a liquid crystal composition including liquid crystal molecules LM which are sealed in the gap.

The alignment film AL1 and the alignment film AL2 are subjected to rubbing treatment so as to restrict the alignment of the liquid crystal molecules LM included in the liquid crystal layer LQ. The liquid crystal molecules LM are aligned by the restrictive force that is caused by the alignment film AL1 and alignment film AL2. The rubbing direction of each of the alignment film AL1 and alignment film AL2 is non-parallel and non-perpendicular to the major axis of each slit SL formed in the common electrode E2.

At a time of no electric field when no potential difference is created between the pixel electrode E1 and the common electrode E2 (i.e. when no electric field is generated between the pixel electrode E1 and the common electrode E2), the liquid crystal molecules LM are aligned such that their major axis D is parallel to the rubbing direction of the alignment films AL1 and AL2.

The liquid crystal display device includes an optical element OD1 which is provided on one of outer surfaces of the liquid crystal display panel LPN (i.e. that surface of the array substrate AR, which is opposite to the surface thereof that is in contact with the liquid crystal layer LQ), and an optical element OD2 which is provided on the other outer surface of the liquid crystal display panel LPN (i.e. that surface of the counter-substrate CT, which is opposite to the surface thereof that is in contact with the liquid crystal layer LQ). Each of the optical elements OD1 and OD2 includes a polarizer plate. For example, a normally black mode is realized, in which the transmittance of the liquid crystal panel LPN decreases to a minimum (i.e. a black screen is displayed) at a time of no electric field.

Figure 4:
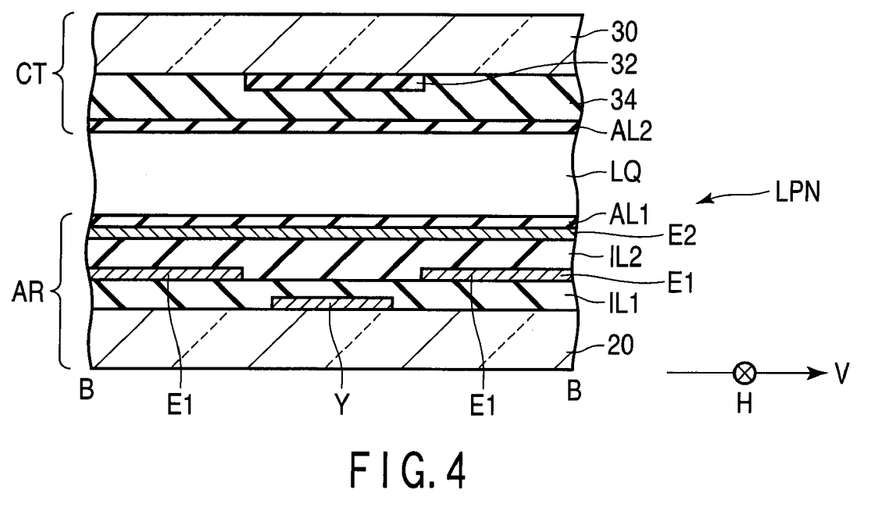
FIG. 4 is a cross-sectional view showing a cross-sectional structure of the pixel of FIG. 2, taken along line B-B in FIG. 2.
Figure 5:
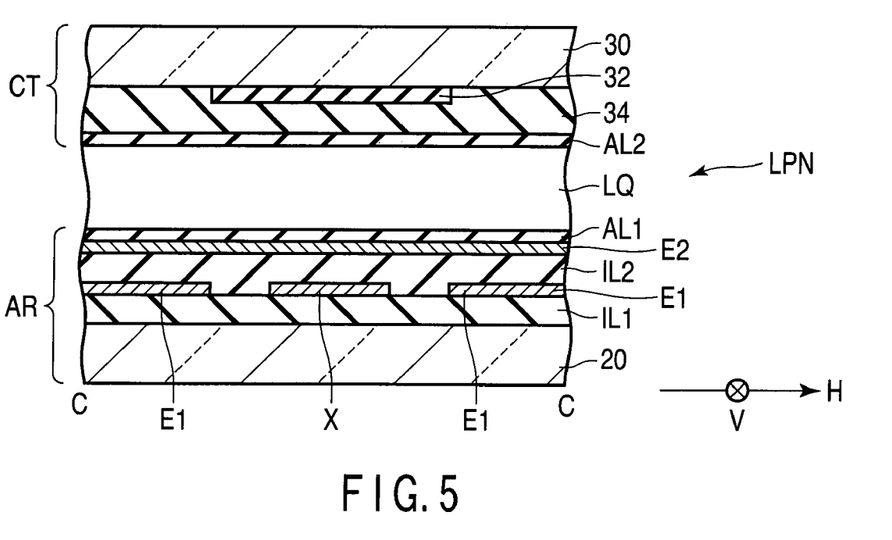
FIG. 5 is a cross-sectional view showing a cross-sectional structure of the pixel of FIG. 2, taken along line C-C in FIG. 2.

Although not shown in FIG. 4 and FIG. 5, the liquid crystal display device includes a backlight unit BL which is disposed on the array substrate AR side of the liquid crystal display panel LPN.

In this liquid crystal display device, when a potential difference is produced between the pixel electrode E1 and the common electrode E2 (i.e. at a voltage application time when a voltage of a potential different from the common potential is applied to the pixel electrode E1), an electric field is generated between the pixel electrode E1 and the common electrode E2. At this time, the liquid crystal molecules LM are driven such that their major axis D is aligned from the rubbing direction to the direction parallel to the electric field.

If the direction of the major axis D of the liquid crystal molecules LM is varied from the rubbing direction, the modulation radio of light passing through the liquid crystal layer LQ varies. Thus, part of the backlight passing through the liquid crystal display panel LPN from the backlight unit BL passes through the second optical element OD2, and a white screen is displayed. In other words, the transmittance of the liquid crystal display panel LPN varies depending on the magnitude of the electric field. In the liquid crystal mode which makes use of the transverse electric field, the backlight is selectively transmitted in this manner, and an image is displayed.

As described above, in the liquid crystal mode which makes use of the transverse electric field, unlike the liquid crystal mode which makes use of a vertical electric field, the counter-electrode side is set in an electrically floating state and is easily affected and electrified by the electric field of the array substrate side. In particular, the black matrix 32, which is so disposed as to be opposed to the wiring portion, tends to be easily electrified by the effect of the gate potential of the gate line Y.

Specifically, at the timing when the level of gate potential shifts, the potential of the black matrix 32 also shifts, and an unwanted vertical electric field may temporarily be formed in the vicinity of the wiring portion. In other cases, an unwanted transverse electric field, which is different from a substantial transverse electric field that is needed for driving liquid crystal molecules, is produced. The potential of the once electrified black matrix 32 decreases to a ground level (ground potential) with the passing of time, but light leakage or flicker may occur during the time that is needed for the decrease, leading to degradation in display quality.

In the present embodiment, as shown in FIG. 4 that is a cross-sectional view taken along line B-B in FIG. 4, the common electrode E2 is disposed to be opposed to the gate line Y via the first insulation film IL1 and second insulation film IL2.

Specifically, the common electrode E2, which is set at the common potential, lies between the gate line Y and the counter-substrate CT. If the cross section of FIG. 4 is viewed from the counter-substrate CT side, the gate line Y is covered with the first insulation film IL1, second insulation film IL2 and common electrode E2. In other words, in the plan view of FIG. 2, the gate line Y overlaps the common electrode E2.

With the above-described structure, since the common electrode E2 shields the electric field that is generated by the gate potential from the gate line Y, the electrification of the black matrix 32 on the counter-substrate side can be suppressed.

Thereby, the occurrence of light leakage or flicker in the vicinity of the wiring portion can be prevented, and a good display quality can be realized.

The above-described common electrode E2 is disposed to face at least the pixel electrode E1 and gate line Y of each pixel PX. In addition, the common electrode E2 may be formed over the entirety of the display area DSP. In other words, the common electrode E2 may be formed to cover the entire display area DSP. In this case, the common electrode E2 is common to all pixels PX, and is disposed to face the source line X, as shown in FIG. 5 that is a cross-sectional view taken along line C-C in FIG. 2. Needless to say, the common electrode E2, in this case, extends so as to face the region between the pixel electrode E1 and the gate line Y and the region between the pixel electrode E1 and the source line X. In this case, in the plan view of FIG. 2, the common electrode E2 overlaps the pixel electrode E1, the gate line Y and the source line X.

Since the common electrode E2, which is disposed in this fashion, is formed of the light-transmissive, electrically conductive material, as described above, the liquid crystal molecules can be driven by making use of a desired transverse electric field, not only in the region where the common electrode E2 faces the pixel electrode E1, but also in the region between the pixel electrode E1 and the source line X and the region between the pixel electrode E1 and the gate line Y, and these regions contribute to display. Therefore, the aperture ratio of each pixel PX, which contributes to display, can be increased, and the transmittance or luminance of each pixel PX can be increased.

In the case where the common electrode E2 is formed over the entire display area DSP, it is possible to shield the electric field that is generated from the source line X, and to suppress the electrification of the black matrix 32 on the counter-substrate side. It is thus possible to obtain the same advantageous effect as in the above-described case of covering the gate line Y with the first insulation film IL1, second insulation film IL2 and common electrode E2.

On the other hand, as shown in FIG. 5, the pixel electrode E1 and source line X are provided in the same layer on the first insulation film IL1. In the case where the pixel electrode E1 and source line X are disposed close to each other in the same layer on the first insulation film IL1, electrical coupling between the pixel electrode E1 and source line X becomes non-negligible. In the case where such unwanted coupling occurs, a desired pixel potential cannot be obtained, and a display defect may occur. Furthermore, in the case where a large distance is secured between the pixel electrode E1 and source line X in order to reduce coupling, the aperture ratio may decrease.

Figure 6:
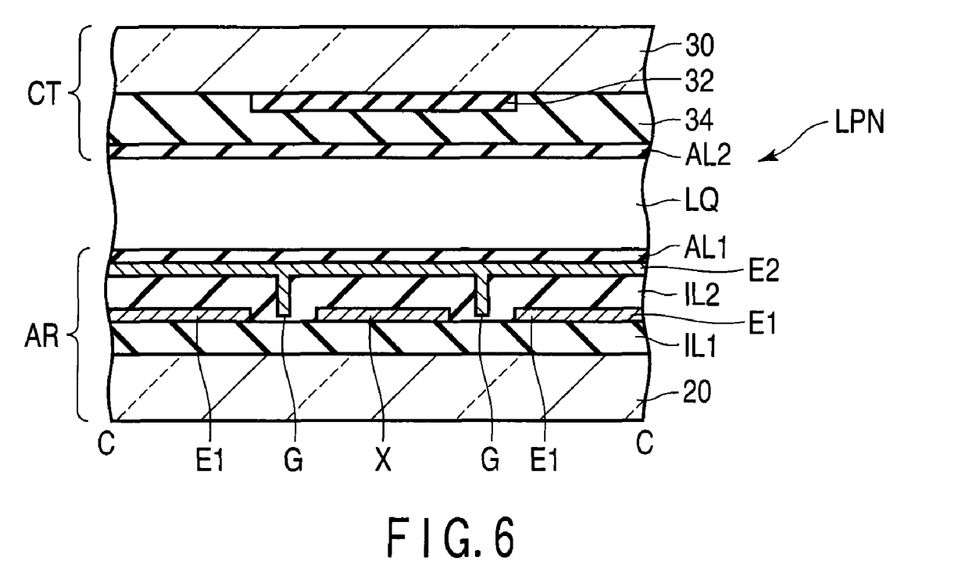
FIG. 6 is a cross-sectional view that schematically shows another structure of the array substrate which is applicable to the present embodiment.

In the case where the above-described unwanted coupling occurs, a trench G is formed between the pixel electrode E1 of the second insulation film IL2 and the source line X, as shown in FIG. 6, in the present embodiment, and the common electrode E2 is also disposed in this trench G. Specifically, the common electrode E2, which is set at the common potential, lies between the pixel electrode E1 and the source line X, which are disposed in the same layer. Since the common electrode E2 effects shielding between the pixel electrode E1 and the source line X, unwanted coupling can be suppressed.

Thereby, a good display quality can be realized. In addition, there is no need to increase the distance between the pixel electrode E1 and source line X, and a decrease in aperture ratio can be suppressed.

Figure 7:
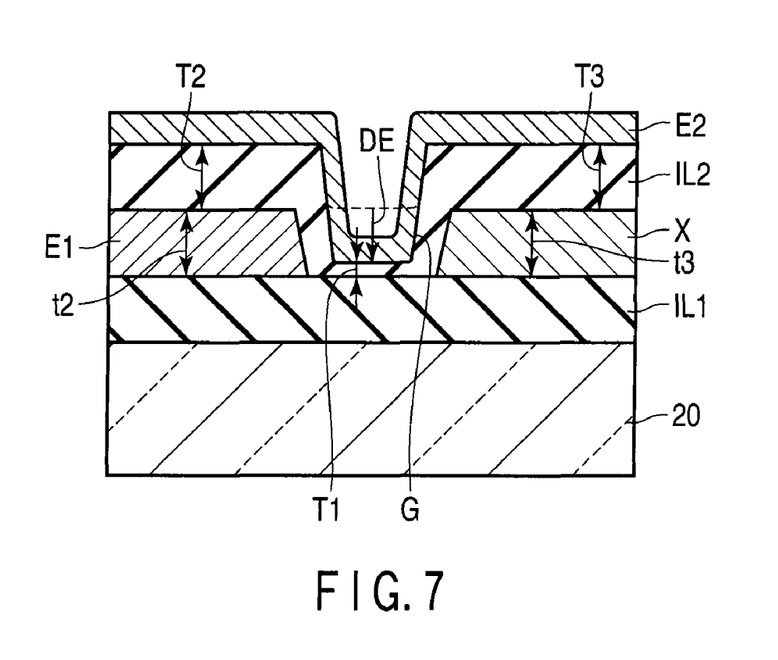
FIG. 7 is a cross-sectional view that shows, in enlarged scale, a region of a trench shown in FIG. 6.

A description is given of the trench G that is formed in the second insulation film IL2. As shown in FIG. 7, since the common electrode E2 is disposed in the trench G, the trench G, as a matter of course, is so formed as not to penetrate to the underlying electrically conductive layer. For example, in the process of forming a through-hole in the second insulation film IL2, the trench G is formed to have such a depth DE as not to penetrate to the first insulation film IL1 in a photolithography step using half-tone exposure. The depth DE of the trench G corresponds to a difference between the thickness of the second insulation film IL2 at the time of film formation, as indicated by a broken line in FIG. 7, and the thickness after the photolithography step, as indicated by a solid line in FIG. 7.

Specifically, as shown in FIG. 7, the thickness T1 of the second insulation film IL2, which is left between the trench G and the first insulation film IL1, is less than the thickness t2 of the pixel electrode E1 and is less than the thickness t3 of the source line X (T1<t2, T1<t3). In addition, the thickness T1 is less than the thickness T2 of the second insulation film IL2 on the pixel electrode E1 and is less than the thickness T3 of the second insulation film IL2 on the source line X (T1<T2, T1<T3).

By the formation of the trench G, the common electrode E2 can be made to present between the pixel electrode E1 and the source line X, and the coupling between the pixel electrode E1 and source line X can be suppressed.

Figure 8:
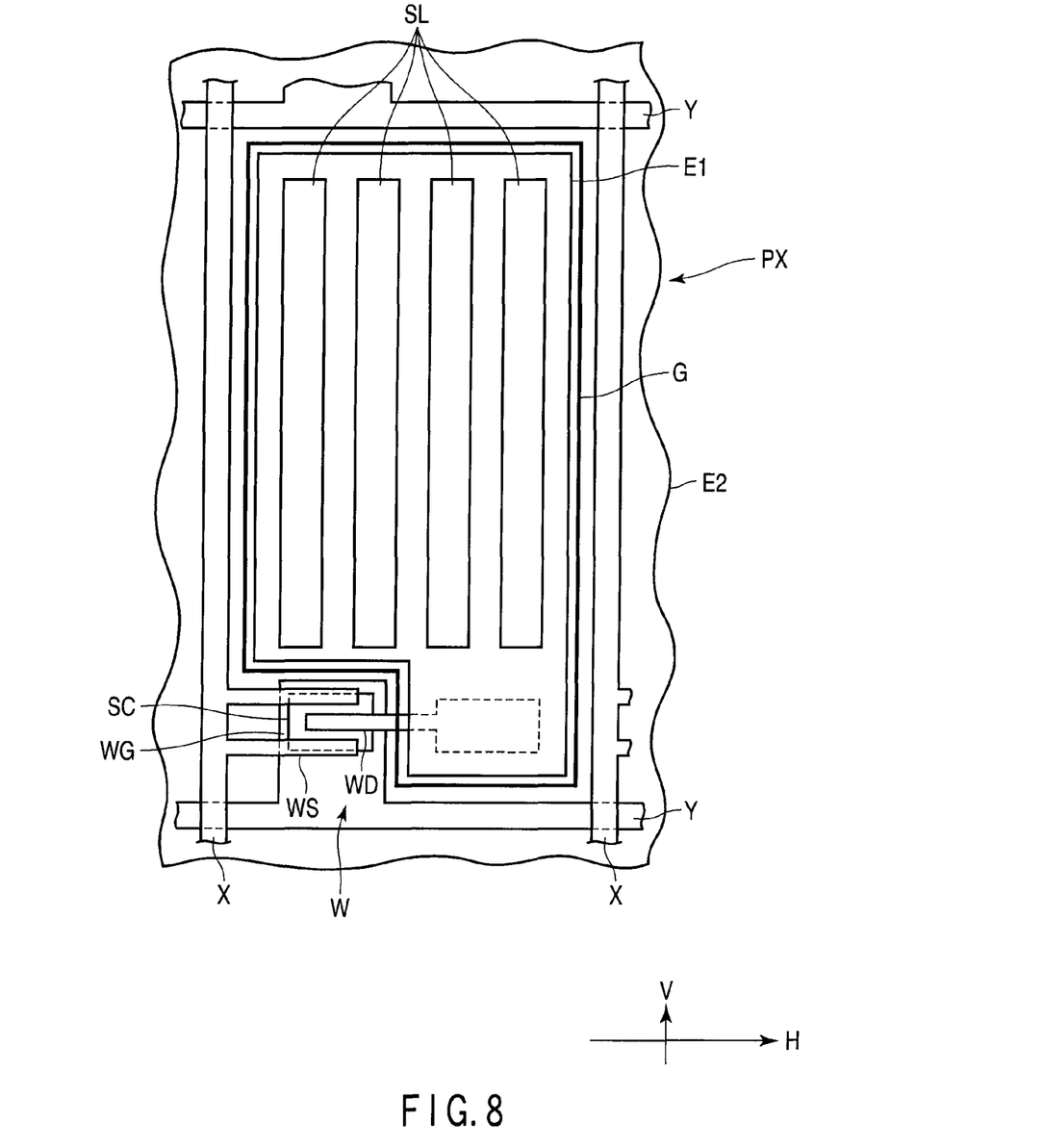
FIG. 8 is a plan view that schematically shows still another structure of the array substrate which is applicable to the present embodiment.

As shown in FIG. 8, the trench G may be so formed as to surround the pixel electrode E1. Specifically, the trench G may be formed not only between the pixel electrode E1 and the source line X, but also between the pixel electrode E1 and the gate line Y, and thus formed in a substantially loop shape. In this case, the common electrode E2 is also formed in the trench G surrounding the pixel electrode E1.

In the case of adopting this structure, the shield effect between the pixel electrode E1 and the wiring portion can further be improved, and a desired pixel potential can stably be obtained.

It should suffice if the depth of the trench G, which is formed between the pixel electrode E1 and the source line X, is so set as not to penetrate to the underlying electrically conductive layer (or wiring). For example, in order to further enhance the shield effect by the common electrode E2 that is disposed in the trench G, the trench G may be formed to have such a depth as to penetrate the second insulation film IL2 and to reach an inside part of the first insulation film IL1 (i.e. such a thickness as not to penetrate the first insulation film IL1).

The depth of the above-described trench G is so set as not to break the underlying wiring, or as to prevent short-circuit between the common electrode E2 and other wiring. In the case of providing the trench G at a location where neither line breakage nor short circuit occurs, the trench G may penetrate both the second insulation film IL2 and first insulation film IL1.

As has been described above, the present embodiment can provide a liquid crystal display device which can realize a good display quality.

The present invention is not limited directly to the above-described embodiment. In practice, the structural elements can be modified and embodied without departing from the spirit of the invention. Various inventions can be made by properly combining the structural elements disclosed in the embodiment. For example, some structural elements may be omitted from all the structural elements disclosed in the embodiment. Furthermore, structural elements in different embodiments may properly be combined.

What is claimed is:

1. A liquid crystal display device which is configured to hold a liquid crystal layer between a first substrate and a second substrate, the first substrate comprising:
    an insulating substrate;
    a gate line extending in a first direction on the insulating substrate;
    a first insulation film which is disposed to cover the gate line;
    pixel electrodes which are disposed on the first insulation film in respective pixels;
    a source line which is disposed on the first insulation film and extends between the pixel electrodes along a second direction which crosses the first direction;
    a second insulation film which is disposed to cover the pixel electrodes and the source line; and
    a common electrode which is disposed on the second insulation film in a manner to face the pixel electrodes and to face the gate line, and includes a slit which is formed to face the pixel electrodes, the common electrode being disposed in a trench formed between one of the pixel electrodes and the source line in the second insulation film and to surround the one of the pixel electrodes.

2. The liquid crystal display device according to claim 1, wherein the common electrode is disposed to face the source line, and formed over an entire display area which the pixels are disposed in a matrix.

3. The liquid crystal display device according to claim 1, wherein the second substrate includes a lattice-shaped light-shield layer which faces the gate line and the source line.

4. The liquid crystal display device according to claim 1, further comprising a switching element which is disposed on the insulating substrate and includes a drain electrode which is connected to the pixel electrode.

5. The liquid crystal display device according to claim 1, wherein the pixel electrode and the common electrode are formed of a light-transmissive, electrically conductive material.

* * * * *